Figure 1:
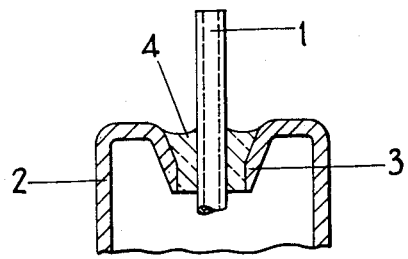

Aug. 16, 1960    L. F. OLDFIELD ET AL    2,948,992
GLASS COMPOSITIONS AND GLASS-TO-METAL SEALS
Filed Feb. 21, 1958

INVENTOR
LUCY FLORENCE OLDFIELD
JOHN HENRY PARTRIDGE

ATTORNEYS

United States Patent Office 2,948,992
Patented Aug. 16, 1960

---

2,948,992

GLASS COMPOSITIONS AND GLASS-TO-METAL SEALS

Lucy Florence Oldfield, Harrow Weald, England, and John Henry Partridge, deceased, late of Pinner, England, by Ethel Partridge and Michael John Anthony Partridge, administrators, Pinner, England, assignors to The General Electric Company Limited, London, England, a British company Filed Feb. 21, 1958, Ser. No. 716,561

Claims priority, application Great Britain Feb. 21, 1957

8 Claims. (Cl. 49—92.5)

This invention relates to glasses suitable for sealing directly to nickel, and to other metals and alloys having thermal expansion characteristics similar to those of nickel, that is to say having mean coefficients of thermal expansion over the temperature ranges of 20° C to 450° C., and 20° C. to 500° C. which do not differ from those of nickel over the same temperature ranges by more than $0.5 \times 10^{-6}$ cm./cm./° C. The invention also relates to glass-to-metal seals formed by sealing glasses in accordance with the invention to nickel or to other metals and alloys of similar thermal expansion characteristics as aforesaid.

Nickel, and such other metals and alloys, may be employed for the construction of components of some electrical devices: for example, nickel may be used for forming a part of the envelope of a device, or for leading-in conductors. Hence, in the manufacture of such a device, it may be required to seal one or more nickel components, or components of other metals and alloys as aforesaid, to a suitable glass, and the invention further relates to such electrical devices in which the glass-to-metal seals are manufactured using a glass in accordance with the invention.

It is well known that in order to obtain a satisfactory glass-to-metal seal, with little or no stress in the glass in the vicinity of the seal, it is desirable that the thermal expansion characteristics of the glass and metal components to be sealed together should be closely matched to one another over the range of temperatures to which the seal is subjected in manufacture thereof and in the manufacture and operation of the device of which the seal forms part: close matching is particularly desirable at the upper annealing temperature of the glass.

The present invention is concerned primarily with the provision of glasses capable of sealing satisfactorily to nickel, the thermal expansion coefficients ($\alpha$) of which over various temperature ranges are as follows:

Over the temperature range of 20° C. to 350° C.;
$\alpha = 15.0 \pm 0.1 \times 10^{-6}$ cm./cm./° C.
Over the temperature range of 20° C. to 400° C.;
$\alpha = 15.2 \pm 0.1$ cm./cm./° C.
Over the temperature range of 20° C. to 450° C.;
$\alpha = 15.3 \pm 0.1$ cm./cm./° C.
Over the temperature range of 20° C. to 500° C.;
$\alpha = 15.4 \pm 0.1$ cm./cm./° C.

Thus it is an object of the present invention to provide a soft glass, which anneals in the temperature range of 400° C. to 500° C. and is capable of flowing easily at temperatures of about 700° C. to 800° C., and which has a sufficiently high thermal expansion coefficient to render it suitable for sealing directly to nickel. In order to form a satisfactory seal with nickel, it is desirable that the expansion coefficient of the glass should be not appreciably higher than that of nickel and that it should not differ from that of nickel by substantially more than $0.5 \times 10^{-6}$ cm./cm./° C., at the annealing temperature of the glass. The glasses in accordance with the invention will in general seal satisfactorily to other metals and alloys having thermal expansion characteristics similar to that of nickel, as aforesaid.

It is furthermore desirable for glasses used in the construction of electrical devices to possess high electrical resistivity, for example not less than $10^9$ ohm cm. at 50° C., so that the glasses are effective as insulators; it is also desirable for glasses so employed to be resistant to attack by moisture and by chemicals, especially dilute mineral acids, which may be used for cleaning the metal components of the devices, and to withstand heating to relatively high temperatures, which may obtain in operation of such devices, without devitrification. Accordingly it is a further object of the invention to provide a glass possessing these desirable properties in addition to the softness and thermal expansion characteristics referred to above.

According to one aspect of the invention a glass suitable for sealing to nickel, or other metal or alloy of like thermal expansion characteristic, has a composition in the range of 45% to 50% silica ($SiO_2$), 12% to 22% sodium oxide ($Na_2O$), 0 to 10% potassium oxide ($K_2O$), 20% to 30% alkaline earth metal oxides

$$(BaO + SrO + CaO)$$

including only 0 to 5% calcium oxide, 0 to 2% fluorine ($F_2$), 0 to 2% alumina ($Al_2O_3$), 0.5% to 10% zinc oxide (ZnO), and 0.5% to 3% of either zirconia ($ZrO_2$) or titania ($TiO_2$), the total content of alkali metal oxides ($Na_2O + K_2O$) being in the range of 18% to 22%.

According to another aspect of the invention, a glass-to-metal seal consists of a metal body of nickel, or other metal or alloy of like thermal expansion characteristic, sealed to a glass having a composition within the range specified in the preceding paragraph.

According to yet another aspect of the invention, an electrical device has an envelope including or containing at least one glass-to-metal seal of the kind specified in the immediately preceding paragraph.

All proportions referred to in this specification and in the appended claims are by weight, and the range of compositions referred to above for the glasses in accordance with the invention is inclusive of the end figures quoted for each constituent.

The compositions specified herein are the compositions of the glasses after founding and for arriving at them account might need to be taken, in preparing the initial batch of raw materials, of possible changes in composition which may occur during founding due to the volatilisation of part of some constituent, especially fluorine and alkali metal oxides, and to corrosion of the refractory material of which the furnace walls are formed, which may result, for example, in an increase in the alumina content of the glass by an amount up to 1%. Thus it may be necessary to adjust the composition of the initial batch, in well known manner, by including therein slightly larger proportions of the ingredients yielding fluorine and alkali metal oxides, and a slightly smaller proportion of alumina, than the proportions theoretically required to give a glass of the desired composition.

However, by carrying out the founding under carefully controlled temperature conditions, and in a pot or tank whose walls are composed of material not subject to appreciable corrosion by the molten glass, it is possible to produce a glass whose analytical composition is very close to the nominal composition, that is to say the exact composition aimed at, with little adjustment of the batch composition.

The glasses in accordance with the invention are manufactured in well-known manner by melting batches of raw materials commonly used in the glass manufacturing industry for providing the various constituents of the glasses, specified above. For example, in addition to sand the batch usually includes the carbonates of the alkali metals and alkaline earth metals, and the oxides of zinc and either zirconium or titanium, and may also contain alumina. Cryolite is preferably used as the source of fluorine, when the latter is included, and also provides a small proportion of alumina. The glasses may be founded at temperatures of 1300° C. to 1350° C., suitably in a tank furnace having walls of aluminosilicate refractory material; preferably the furnace walls are composed of mullite tank blocks manufactured by the method described in U.S. Patent No. 2,675,324. Founding is completed in a relatively short time, for example two hours from the final addition of batch being sufficient for a quantity of glass weighting about 1½ hundredweight. Such a quantity of glass is cooled to the working temperature, which for these glasses is about 1000° C. to 1050° C., in about two hours.

All of the glasses in accordance with the invention which we have prepared and examined are of the required degree of softness specified above, annealing at temperatures within the range of 400° C. to 500° C., and having Mg points in the range of 470° C. to 510° C.: the Mg point of a glass is defined as the highest temperature attainable on the thermal expansion-temperature curve obtained with a rod of the glass, above which temperature the glass is deformed, at a rate similar to its rate of expansion, by the small pressure exerted on the rod by the optical lever or dial gauge against which it abuts in the apparatus used for determining the expansion, the rod usually being supported horizontally if an optical lever is used and vertically if a dial gauge is used. All of said glasses also possess coefficients of thermal expansion in the range of 14.5 to $15.5 \times 10^{-6}$ cm./cm./° C. at their upper annealing temperatures, and are therefore sufficiently well matched to nickel to form satisfactory seals therewith and with other metals and alloys of similar thermal expansion characteristics to that of nickel. Furthermore, we have found that these glasses are capable of forming satisfactory mismatch compression seals with metals of higher thermal expansion coefficients than nickel, for example copper. The high thermal expansion of the glasses of the invention is achieved by using high proportions of alkali and alkaline earth metal oxides.

These glasses are further characterised by possessing a high degree of fluidity, being capable of flowing readily at temperatures of 700° C. to 800° C. An indication of the fluidity of a glass is given by its fibre softening point, which is defined as the temperature at which the viscosity of the glass is $10^{7.6}$ poises. The glasses of the invention possess low fibre softening points, those which we have determined all being in the range of 600° C. to 650° C. The fluidity of the glasses is increased by the inclusion of a small proportion of fluorine, within the range specified above.

The inclusion of the specified proportions of the oxides of the divalent metals strontium, barium and zinc ensures that the glasses will possess relatively high electrical resistivities, above $10^9$ ohm cm. at 50° C., the said divalent metal oxides counteracting the effect of the high alkali content which tends to reduce the resistivity as compared with glasses of low alkali content.

The glasses of the invention possess sufficiently good chemical durability to enable them to resist attack by the acids generally used for cleaning nickel, in the manufacture of devices which include nickel components; the required chemical durability is achieved by using the correct relative proportions of the alkali and alkaline earth metal oxides, and by the inclusion of alumina, zirconia or titania, and zinc oxide, which improve the chemical durability of glasses.

The tests employed for determining the durability of these glasses consist essentially in boiling two samples of the glass, for one hour respectively in distilled water and in dilute hydrochloric acid containing 20 ml. of HCl in 100 ml. of the solution. The samples are wiped dry gently with paper tissues, heated in air to a temperature below 80° C., and examined under a low power microscope for surface leaching and other defects. The samples are then heated at 150° C. for 30 minutes, and re-examined. A glass so treated is considered to possess "good" durability if both of the samples show only slight pitting or crazing, to a penetration of less than one thousandth of an inch, visible at a magnification of 10, with no surface breakdown, and solution of less than 0.5% by weight of the glass. If negligible pitting or crazing is apparent at a magnification of 10, although these effects may be detectable at a magnification of 30, and solution of the glass is negligible, that is to say not more than a few milligrams dissolved from 10 grams of glass, the durability of the glass is regarded as "excellent." The examination of the samples is carried out on freshly broken surfaces, which are less durable than fire polished surfaces; in some cases fire polished surfaces are also examined since the durability of such surfaces is of interest in relation to fabricated glassware.

The glasses of the invention are free from easily reducible oxides, such as lead oxide: this feature of the glass composition is particularly advantageous when the glass is used for manufacturing articles by sintering glass powder initially mixed with an organic binder, as for example in the manufacture of sintered glass beads for sealing leading-in wires into electrical devices. Thus there is no tendency for reduction of any of the constituents of the glass by the organic binder or any decomposition product thereof to occur, so that a clear colourless glass may readily be obtained.

It may be noted that, although the total alkaline earth (BaO, SrO and CaO) content of these glasses is relatively high, from 20% to 30%, the calcium oxide content is not greater than 5%: this low limit on the calcium oxide content reduces any tendency of the glasses to devitrify, so that they are substantially free from devitrification at the working temperatures. This property may also be of value for a glass incorporated in an electrical device may be subjected to temperatures up to 1000° C. in manufacture or operation.

The glasses in accordance with the invention possess the additional advantages that they are easily founded, and we have found that very little variation occurs in the resultant composition of the products obtained from different raw batches each of the same composition, and that they are of good quality suitable for use in the manufacture of tubing, envelopes of electrical devices, and similar ware, by well-known methods.

The compositions and some of the properties of some specific glasses, A, B, C, D, E, F and G, in accordance with the invention are given in the following table, by way of example. The compositions are in parts by weight, and the properties referred to are the mean coefficients of thermal expansion ($\alpha$) over the temperature range from room temperature to the Mg temperature, the Mg temperatures, annealing temperature ranges, the electrical resistivity ($\rho$) expressed as the value of the logarithm to base 10, the fibre softening points and the chemical durability.

Table

| Composition | A | B | C | D | E | F | G |
|---|---|---|---|---|---|---|---|
| $SiO_2$ | 48.0 | 47.0 | 50.0 | 50.0 | 48.0 | 48.0 | 48.0 |
| $Na_2O$ | 21.0 | 20.5 | 13.0 | 13.0 | 20.5 | 21.0 | 21.5 |
| $K_2O$ | | | 8.0 | 8.0 | 9.5 | 8.5 | 8.0 |
| $BaO$ | 8.5 | 9.5 | 8.0 | 8.0 | 10.0 | 10.0 | 10.0 |
| $SrO$ | 10.0 | 10.0 | 10.0 | 10.0 | 3.0 | 3.0 | 3.0 |
| $CaO$ | 3.0 | 4.0 | 3.0 | 3.0 | 2.0 | 2.0 | 2.0 |
| $F_2$ | 1.5 | 1.5 | | | 1.0 | 1.0 | 1.0 |
| $Al_2O_3$ | 1.0 | 1.0 | 1.0 | 1.0 | 5.0 | 6.0 | 5.0 |
| $ZnO$ | 5.0 | 5.0 | 5.0 | 5.0 | | | |
| $ZrO_2$ | 2.0 | 1.5 | 2.0 | | 2.0 | 1.0 | 2.0 |
| $TiO_2$ | | | | 2.0 | | | |
| Properties: | | | | | | | |
| $\alpha \times 10^6$ cm./cm./°C. (20° C.–Mg) | 15.2 | 14.9 | 14.5 | 14.7 | 15.0 | 14.6 | 14.5 |
| Mg, °C., ±5° C. | 470 | 485 | 505 | 505 | 475 | 485 | 500 |
| Annealing range, °C. | 450–400 | 465–415 | 485–435 | 485–435 | 455–405 | 465–415 | 480–430 |
| Fibre softening point, °C. ±5° C. | 605 | 610 | 640 | 640 | 605 | 600 | 640 |
| log 10$\rho$, ohm cm. at 50° C. | 10.9 | 11.0 | 14.5 | 14.6 | 11.0 | | |
| Durability: | | | | | | | |
| Water Test | Excellent | Excellent | Excellent | Excellent | Excellent | Excellent | Excellent. |
| HCl Test | Fairly good | Fairly good | Good | Good | Fairly good | Fairly good | Fairly good. |

One specific method of manufacturing a glass in accordance with the invention will now be described by way of example.

In this example, for the production of approximately 100 lbs. of glass of composition A in the above table, a typical batch of raw materials is prepared by mixing the following ingredients:

| | |
|---|---|
| Dutch sand ($SiO_2$) | 48 lbs. |
| Witherite ($BaCO_3$) | 11 lbs. |
| Limespar ($CaCO_3$) | 5 lbs., 6 ozs. |
| Strontium carbonate | 14 lbs., 4 ozs. |
| Sodium carbonate | 36 lbs. |
| Cryolite ($3NaF \cdot AlF_3$) | 4 lbs., 10 ozs. |
| Zinc oxide | 5 lbs. |
| Zirconia | 2 lbs. |

The amount of cryolite included in this batch is sufficient to allow for 25% loss of fluorine during founding. The alumina is also derived from the cryolite, together with a small amount picked up from the furnace refractory. The sodium content of the cryolite corresponds very closely to the amount of $Na_2O$ volatilised during founding.

The batch is introduced, in several portions successively, into a small tank furnace, having walls composed of mullite-type blocks. The material in the tank is heated to 1300° C. and is maintained at this temperature for two hours after the final addition of batch, to complete the founding of the glass. The glass is allowed to cool in the tank over a period of 2 hours to the working temperature of 1050° C.

The glasses of the invention, exemplified by the compositions given in the above table, are suitable for the manufacture of glass beads which may be used, for example, for sealing small components of nickel or other metal or alloy of like expansion characteristics such as wires or small cylinders, into components formed of other high expansion metals, such as copper canisters.

The glasses may also be employed in powder form for sealing two metal components together, the loose glass powder being introduced without a binder between the surfaces of the metal components to be united and the whole assembly being heated to a suitable temperature as aforesaid with or without an auxiliary pressing operation. One of the most important uses of these glasses is, in the form of glass beads, for sealing leading-in conductors into apertures in metal components: the beads may be formed by any of the well known techniques which comprise heating a short length of glass tubing slipped over the conductor, or sintering glass powder, or applying the softened end of a glass rod to the surface of a conductor and rotating the rod and the conductor relative to one another until a bead of glass has been deposited around the conductor; in each case the seal is formed by heating the bead and metal components to a suitable temperature above 700° C.

In many cases the most convenient type of bead to use is that formed of sintered glass powder.

Glass powder, for use either in the loose state or for forming sintered glass beads, can be produced from any of the glasses with which the invention is concerned by dragading, that is to say by pouring the molten glass into water to form coarse granular material from which the water is immediately removed by siphoning and which is then dried at 120° C. to 200° C.; the dragaded glass is then ball milled to reduce it to powder mainly consisting of particles capable of passing through a sieve having 40 meshes to the linear inch but retained on a sieve having 200 meshes to the linear inch.

For forming sintered glass beads, for example from glass A in the above table, glass powder produced as described above is mixed with a binder consisting of polybutyl methacrylate, 100 grams of glass powder being mixed with 3 to 5 grams of polybutyl methacrylate, dissolved in 25 cc. of sulphur-free toluene; the mixture is dried in air at approximately 40° C. for at least 24 hours, with occasional stirring to prevent caking. The dried, bonded powder is granulated through a 40 mesh sieve, and is then compacted under a pressure of 4 to 5 tons per square inch in a mould to form beads of the required size and shape and provided with apertures for the insertion of conductors, if required.

The compacted beads are heated in stages to effect first volatilisation of the binder, and then sintering. The beads are first heated slowly in air to 200° C. to 250° C. and are maintained at this temperature for ½ to 1 hour to ensure complete removal of the binder. The temperature is then raised slowly to 550° C. to 560° C.; the beads are maintained at 550° C. to 560° C. for about 10 minutes to effect sintering. The beads are allowed to cool in the oven in which the heating has been carried out, the oven door being left slightly open to prevent over-sintering.

One form of glass-to-metal seal in which a glass in accordance with the invention is employed, and an electrical device incorporating such a seal, are shown in the accompanying drawings, and will now be described by way of example. In the drawings, Figure 1 shows a glass-to-metal seal in sectional elevation, and Figure 2 is a perspective view of a device incorporating a seal of the form shown in Figure 1.

Referring to Figure 1 of the drawings, a nickel tube 1 is sealed into the aperture in a re-entrant part 3 of the end wall of a copper cylinder 2, using a bead 4 which is pre-formed by sintering a powdered glass in accordance with the invention.

Figure 2:
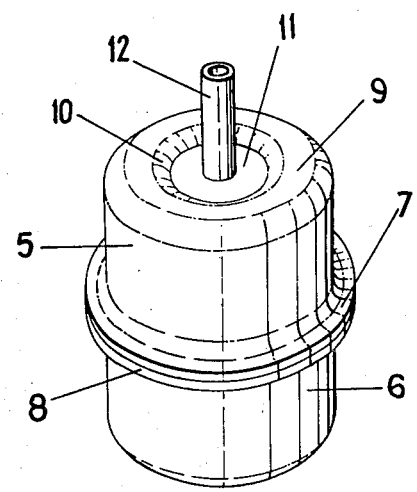

The device shown in perspective in Figure 2 of the drawings, which may for example be a semi-conductor device of known kind, comprises a cylindrical copper canister containing any desired operative components (not shown in the drawing). The copper canister is formed of two parts 5 and 6, provided respectively with flanges 7 and 8 which are united together, for example by cold welding. The end surface 9 of the part 5 has a central re-entrant apertured portion, indicated at 10, into which are sealed a glass bead 11 and a nickel tube 12, the seal being of the form shown in, and described above with reference to Figure 1.

The glasses of the invention may also be employed for the manufacture of tubing, and ware such as the glass parts of envelopes of electric discharge devices, by well known drawing, blowing and moulding techniques. Such glass components can be sealed directly to components formed of nickel or a metal or alloy of like thermal expansion characteristic, by heating contacting parts of the glass and metal components to a suitable temperature between 700° C. and 800° C. at which the glass flows readily.

In order to obtain a strong vacuum-tight seal between a glass in accordance with the invention and nickel, it is desirable that the surface of the nickel should be treated to produce a film of green nickelous oxide thereon, immediately prior to the sealing operation. In the preferred method of treating nickel for this purpose the nickel components are first immersed in a cold solution consisting of 900 ccs. of distilled water, 750 ccs. of concentrated sulphuric acid, 1000 ccs. of concentrated nitric acid and 50 gms. of sodium chloride. The nickel is left in this solution until gas is being evolved freely, usually not longer than 30 seconds, and is then washed thoroughly with distilled water, the last traces of acid being removed preferably by boiling in distilled water. The nickel is rough dried, and then heated at 1050° C. in wet hydrogen for 30 minutes. The nickel is finally heated in a reducing flame to approximately 1000° C. for a few seconds and is then allowed to cool to a dull red heat in air: the required oxide film is formed during this cooling period. As soon as the nickel has cooled sufficiently, it is sealed to the glass, using an oxidising flame, at a temperature of 650° C. to 750° C.

What is claimed is:

1. A glass for sealing to nickel and to metals and alloys having thermal expansion characteristics such that the mean coefficients of thermal expansion over the temperature ranges of 20° C. to 450° C. and 20° C. to 500° C. do not differ from those of nickel over the same temperature ranges by more than $0.5 \times 10^{-6}$ cm./cm./° C., which has a composition, by weight, in the range of 45% to 50% silica ($SiO_2$), 12% to 22% sodium oxide ($Na_2O$), 0 to 10% potassium oxide ($K_2O$), 20% to 30% alkaline earth metal oxides ($BaO+SrO+CaO$) including only 0 to 5% calcium oxide, 0 to 2% fluorine ($F_2$), 0 to 2% alumina ($Al_2O_3$), 0.5% to 10% zinc oxide ($ZnO$), and 0.5% to 3% of one of the oxides selected from the group consisting of zirconia ($ZrO_2$) and titania ($TiO_2$), the total content of alkali metal oxides ($Na_2O+K_2O$) being in the range of 18% to 22%.

2. A glass according to claim 1 which is composed of 48.0% $SiO_2$, 21.0% $Na_2O$, 8.5% BaO, 10.0% SrO, 3.0% CaO, 1.5% $F_2$, 1.0% $Al_2O_3$, 5.0% ZnO, and 2.0% $ZrO_2$, by weight.

3. A glass according to claim 1 which is composed of 47.0% $SiO_2$, 20.5% $Na_2O$, 9.5% BaO, 10.0% SrO, 4.0% CaO, 1.5% $F_2$, 1.0% $Al_2O_3$, 5.0% ZnO, and 1.5% $ZrO_2$, by weight.

4. A glass according to claim 1 which is composed of 50.0% $SiO_2$, 13.0% $Na_2O$, 8.0% $K_2O$, 8.0% BaO, 10.0% SrO, 3.0% CaO, 1.0% $Al_2O_3$, 5.0% ZnO, and 2.0% $ZrO_2$, by weight.

5. A glass according to claim 1 which is composed of 50.0% $SiO_2$, 13.0% $Na_2O$, 8.0% $K_2O$, 8.0% BaO, 10.0% SrO, 3.0% CaO, 1.0% $Al_2O_3$, 5.0% ZnO, and 2.0% $TiO_2$, by weight.

6. A glass according to claim 1 which is composed of, in parts by weight, 48.0 $SiO_2$, 20.5 $Na_2O$, 9.5 BaO, 10.0 SrO, 3.0 CaO, 2.0 $F_2$, 1.0 $Al_2O_3$, 5.0 ZnO, and 2.0 $ZrO_2$.

7. A vacuum-tight seal between nickel and glass as set forth in claim 1.

8. A vacuum-tight seal between glass as set forth in claim 1 and a metallic body of thermal expansion characteristic such that the mean coefficients of thermal expansion over the temperature ranges of 20° C. to 450° C. and 20° C. to 500° C. do not differ from those of nickel over the same temperature ranges by more than $0.5 \times 10^{-6}$ cm./cm./° C.

References Cited in the file of this patent

UNITED STATES PATENTS

| | | |
|---|---|---|
| 2,318,435 | Stupakoff et al. | May 4, 1943 |
| 2,386,685 | Hood | Oct. 9, 1945 |
| 2,429,432 | Stanworth | Oct. 21, 1947 |
| 2,454,607 | Leberknight et al. | Nov. 23, 1948 |
| 2,468,868 | Danzin et al. | May 3, 1949 |
| 2,587,914 | Smith | Mar. 4, 1952 |
| 2,634,555 | Henry et al. | Apr. 14, 1953 |
| 2,667,432 | Nolte | Jan. 26, 1954 |
| 2,670,572 | Smith | Mar. 2, 1954 |
| 2,688,559 | Armistead | Sept. 7, 1954 |
| 2,693,423 | Rogers | Nov. 2, 1954 |
| 2,697,309 | Gates | Dec. 21, 1954 |
| 2,720,997 | Dailey et al. | Oct. 18, 1955 |
| 2,730,260 | McCullough | Jan. 10, 1956 |
| 2,753,073 | Faulkner | July 3, 1956 |
| 2,770,923 | Dalton et al. | Nov. 20, 1956 |
| 2,821,811 | Hagenberg | Feb. 4, 1958 |
| 2,844,919 | Power | July 29, 1958 |